United States Patent
Quintana et al.

(10) Patent No.: US 8,392,983 B2
(45) Date of Patent: Mar. 5, 2013

(54) TRUSTED LABELER

(75) Inventors: Richard L. Quintana, Carlsbad, CA (US); John R. Owens, Carlsbad, CA (US); John C. Andolina, Vista, CA (US); Stuart N. Shanken, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 908 days.

(21) Appl. No.: 12/184,048

(22) Filed: Jul. 31, 2008

(65) Prior Publication Data

US 2009/0158050 A1     Jun. 18, 2009

Related U.S. Application Data

(60) Provisional application No. 60/962,821, filed on Jul. 31, 2007, provisional application No. 60/962,822, filed on Jul. 31, 2007, provisional application No. 60/962,848, filed on Jul. 31, 2007, provisional application No. 61/026,438, filed on Feb. 5, 2008.

(51) Int. Cl.
*H04L 29/00* (2006.01)
*H04L 12/28* (2006.01)
*H04L 12/56* (2006.01)

(52) U.S. Cl. .............................. 726/13; 726/12; 370/389

(58) Field of Classification Search ............ 726/12, 726/13, 22–25; 370/389–392
See application file for complete search history.

(56) References Cited

U.S. PATENT DOCUMENTS

| | | | |
|---|---|---|---|
| 4,442,484 A | 4/1984 | Childs, Jr. | |
| 4,683,532 A | 7/1987 | Yount et al. | |
| 5,495,533 A | 2/1996 | Linehan et al. | |
| 5,905,725 A * | 5/1999 | Sindhu et al. ................ | 370/389 |
| 5,991,519 A | 11/1999 | Benhammou et al. | |
| 6,408,001 B1 * | 6/2002 | Chuah et al. .................. | 370/392 |
| 6,604,147 B1 * | 8/2003 | Woo .............................. | 709/240 |
| 6,704,871 B1 | 3/2004 | Kaplan et al. | |
| 6,751,729 B1 * | 6/2004 | Giniger et al. ................ | 713/153 |
| 6,836,548 B1 | 12/2004 | Anderson | |
| 6,854,061 B2 | 2/2005 | Cooper et al. | |
| 7,055,029 B2 | 5/2006 | Collins et al. | |
| 7,089,419 B2 | 8/2006 | Foster et al. | |
| 7,213,147 B2 | 5/2007 | Tuvell et al. | |
| 7,274,696 B1 * | 9/2007 | Sikdar .......................... | 370/391 |
| 7,322,042 B2 | 1/2008 | Srinivasan et al. | |
| 7,356,147 B2 | 4/2008 | Foster et al. | |
| 7,441,262 B2 * | 10/2008 | Hui et al. ......................... | 726/1 |

(Continued)

FOREIGN PATENT DOCUMENTS

| EP | 0876026 A2 | 11/1998 |
|---|---|---|
| EP | 1132801 A2 | 9/2001 |

(Continued)

OTHER PUBLICATIONS

Cohen, Gary N., et al. "A New Capability for Creation of MLS ATM LANS and WANS", *MILCOM 97 Proceedings* Monterey, CA, Nov. 2-5, 1997, New York, NY; *IEEE* (1997) vol. 3: 1412-1416.

(Continued)

*Primary Examiner* — Catherine Thiaw
(74) *Attorney, Agent, or Firm* — Kilpatrick Townsend & Stockton LLP

(57) ABSTRACT

A cryptographic device and method are disclosed for processing different levels of classified information. Input and output ports are physically isolated on the cryptographic device. Within the cryptographic device, each port has its packets labeled in such a way that it can be processed differently from other packets by a cryptographic module. High-assurance techniques are used to assure labeling and proper processing of the packets. These labeled packets are intermixed on common pathways regardless of level of classification. Despite intermixing, separation of the packets is assured through the process.

22 Claims, 6 Drawing Sheets

U.S. PATENT DOCUMENTS

| | | | |
|---|---|---|---|
| 7,636,858 | B2 | 12/2009 | Khan et al. |
| 7,660,986 | B1 | 2/2010 | Qiu et al. |
| 7,715,565 | B2 | 5/2010 | Kimmel et al. |
| 7,764,672 | B2 * | 7/2010 | Moriwaki .................... 370/389 |
| 7,773,754 | B2 | 8/2010 | Buer et al. |
| 7,774,619 | B2 | 8/2010 | Paaske et al. |
| 2003/0084309 | A1 | 5/2003 | Kohn |
| 2004/0008685 | A1 * | 1/2004 | Yamano et al. ........... 370/395.5 |
| 2004/0024980 | A1 | 2/2004 | Scott et al. |
| 2004/0066781 | A1 * | 4/2004 | Shankar et al. .............. 370/389 |
| 2004/0258062 | A1 * | 12/2004 | Narvaez ....................... 370/389 |
| 2005/0031119 | A1 | 2/2005 | Ding |
| 2005/0044252 | A1 * | 2/2005 | Floyd et al. .................... 709/230 |
| 2005/0094643 | A1 * | 5/2005 | Wang et al. ................ 370/395.4 |
| 2005/0102546 | A1 | 5/2005 | Patchen et al. |
| 2005/0198412 | A1 | 9/2005 | Pedersen et al. |
| 2005/0278549 | A1 | 12/2005 | Torla et al. |
| 2006/0039335 | A1 * | 2/2006 | Ono et al. ..................... 370/338 |
| 2006/0075311 | A1 * | 4/2006 | Ranjan et al. .................. 714/48 |
| 2006/0114914 | A1 * | 6/2006 | Anand et al. ............ 370/395.53 |
| 2006/0146706 | A1 * | 7/2006 | Nielsen ......................... 370/230 |
| 2006/0174319 | A1 | 8/2006 | Kraemer et al. |
| 2006/0190987 | A1 | 8/2006 | Ohta et al. |
| 2006/0251078 | A1 * | 11/2006 | Shin et al. ..................... 370/392 |
| 2006/0294596 | A1 | 12/2006 | Govindarajan et al. |
| 2007/0014399 | A1 | 1/2007 | Scheidt et al. |
| 2007/0067826 | A1 | 3/2007 | Conti |
| 2007/0101142 | A1 | 5/2007 | Suzuki |
| 2007/0110069 | A1 * | 5/2007 | Lim et al. ...................... 370/392 |
| 2007/0130458 | A1 | 6/2007 | Focke et al. |
| 2007/0156987 | A1 | 7/2007 | Chen et al. |
| 2007/0156999 | A1 | 7/2007 | Durham et al. |
| 2007/0157287 | A1 | 7/2007 | Lim |
| 2007/0220500 | A1 | 9/2007 | Saunier |
| 2007/0226493 | A1 | 9/2007 | O'Brien et al. |
| 2007/0226795 | A1 | 9/2007 | Conti et al. |
| 2007/0250904 | A1 | 10/2007 | Waller |
| 2008/0019358 | A1 * | 1/2008 | Rijsman ........................ 370/389 |
| 2008/0077794 | A1 | 3/2008 | Arnold et al. |
| 2008/0130534 | A1 * | 6/2008 | Tomioka ....................... 370/310 |
| 2008/0215897 | A1 | 9/2008 | Doyle et al. |
| 2009/0034734 | A1 | 2/2009 | Owens et al. |
| 2009/0037631 | A1 | 2/2009 | Owens et al. |
| 2009/0214044 | A1 | 8/2009 | Kinoshita |
| 2009/0249080 | A1 | 10/2009 | Zhang et al. |
| 2009/0282263 | A1 | 11/2009 | Khan et al. |
| 2010/0008499 | A1 | 1/2010 | Lee et al. |

FOREIGN PATENT DOCUMENTS

| | | |
|---|---|---|
| EP | 1326157 A2 | 7/2003 |
| WO | WO2007/006011 A | 1/2007 |
| WO | WO2007/006014 A | 1/2007 |
| WO | WO 2009/018479 A1 | 2/2009 |
| WO | WO 2009/018481 A1 | 2/2009 |
| WO | WO 2009/018483 A1 | 2/2009 |
| WO | WO 2009/018479 A4 | 4/2009 |

OTHER PUBLICATIONS

International Search Report of Dec. 23, 2008 for PCT Patent Application No. PCT/US2008/071818, 3 pages.

International Preliminary Report on Patentability of Feb. 2, 2010 for PCT Patent Application No. PCT/US2008/071818 with Written Opinion, 8 pages.

International Search Report of Oct. 29, 2008 for PCT Patent Application No. PCT/US2008/071821, 3 pages.

International Preliminary Report on Patentability of Feb. 2, 2010 for PCT Patent Application No. PCT/US2008/071821 with Written Opinion, 9 pages.

International Search Report of Nov. 5, 2008 for PCT Patent Application No. PCT/US2008/071823, 3 pages.

International Preliminary Report on Patentability of Feb. 2, 2010 for PCT Patent Application No. PCT/US2008/071823 with Written Opinion, 8 pages.

Non-Final Office Action of Sep. 6, 2011 for U.S. Appl. No. 12/184,0479, 24 pages.

Non-Final Office Action of Aug. 2, 2011 for U.S. Appl. No. 12/184,062, 26 pages.

Final Office Action of Feb. 1, 2012 for U.S. Appl. No. 12/184,079; 27 pages.

Final Office Action of Jan. 12, 2012 for U.S. Appl. No. 12/184,062, 35 pages.

Notice of Allowance of Aug. 29, 2012 for U.S. Appl. No. 12/184,079, 7 pages.

* cited by examiner

TRUSTED LABELER

This application claims the benefit of and is a non-provisional of co-pending: U.S. Provisional Application Ser. No. 60/962,848 filed on Jul. 31, 2007; U.S. Provisional Application Ser. No. 61/026,438 filed on Feb. 5, 2008; U.S. Provisional Application Ser. No. 60/962,821 filed on Jul. 31, 2007; and U.S. Provisional Application Ser. No. 60/962,822 filed on Jul. 31, 2007; which are all hereby expressly incorporated by reference in their entirety for all purposes.

This application expressly incorporates by reference: U.S. application Ser. No. 12/184,079, filed on Jul. 31, 2008, entitled "INPUT OUTPUT ACCESS CONTROLLER" U.S. application Ser. No. 12/184,062, filed on Jul. 31, 2008, entitled "Multi-Level Key Manager"; in their entirety for all purposes.

BACKGROUND

This disclosure relates in general to secure computing systems and, more specifically to high-assurance processing of packets of different classification levels amongst other things.

Governments classify information at different levels generally according to their sensitivity, for example, SECRET versus TOP SECRET. Users of the information are also classified by what level they are able to get access to. For example, someone with a SECRET clearance is not given access to TOP SECRET information. Procedures are put in place to avoid exposure to persons without the proper classification level.

In processing systems, physical security is used to prevent information of different classification levels from bleeding over to a different classification level. To process at multiple classification levels, there may be several devices running in parallel for each classification level. Devices that may be capable of running at multiple classification levels are run at one classification level, cleared out and then run at a different classification level. Intermixing of different classified information is generally taboo in these systems.

There are situations that require smaller cryptographic devices that can process different classification levels. Switching between classification levels takes time and slows down processing. Some have proposed trusted operating systems that can process information with more flexibility, but these solutions are avoided due to a lack of trust.

SUMMARY

In an embodiment, a cryptographic device and method are disclosed for processing different levels of classified information in a very high-assurance manner. Input and output ports are physically isolated on the cryptographic device. Within the cryptographic device, each port has its packets labeled in such a way that it can be processed differently from other packets by a cryptographic module. High-assurance techniques are used to assure labeling and proper processing of the packets. These labeled packets are intermixed on common pathways regardless of level of classification. Despite intermixing, separation of the packets is assured through the total process.

In one embodiment, a cryptographic device for processing classified information having a number of different classification levels is disclosed. The cryptographic device includes a first input port, a first input labeler, a second input port, a second input labeler, an input label checker, a cryptographic module, a first output port, a second output port, a router, and an output label checker. The first input labeler is coupled to the first input port, where the first input labeler labels first packets from the first input port. The second input port is physically isolated from the first input port. The second input labeler is coupled to the second input port, where the second input labeler labels second packets from the second input port. The input label checker between the first and/or second input labelers and a cryptographic module that checks if the first and/or second input labelers are functioning correctly. The cryptographic module is coupled to the input and output labelers to process the first and second packets. The cryptographic module uses input label to distinguish the first packets from the second packets and produces a first processed packet from the first packet and a second processed packet from the second packet. The second output port is physically isolated from the first output port. The router is coupled to the cryptographic module that receives the first and second processed packets on a common datachannel. The router divides out the first processed packets from the second processed packets according to output label. The router couples the first processed packets to the first output port without including the second processed packets and the second processed packets to the second output port without including the first processed packets. The output label checker is situated between the cryptographic module and the first and/or second output ports to check if the router is functioning correctly.

In another embodiment, a cryptographic device for processing information divided into partitions in a high-assurance manner is disclosed. The cryptographic device includes a first and second input ports, a first and second input labelers, a cryptographic module, a first and second output ports, and a router. The first input labeler is coupled to the first input port, wherein the first input labeler labels first packets from the first input port. The second input port is physically isolated from the first input port. The second input labeler is coupled to the second input port, where the second input labeler labels second packets from the second input port. The cryptographic module is coupled to the input and output labelers to process the first and second packets according to input label. Different processing algorithms are used for the first and second packets to produce a first processed packet and a second processed packet. The cryptographic module uses label to distinguish the first packets from the second packets. The second output port physically isolated from the first output port. The router is coupled to the cryptographic module that receives the first and second processed packets on a common datachannel. The router divides out the first processed packets from the second processed packets according to output label. The router couples the first processed packets to the first output port without including the second processed packets. The router couples the second processed packets to the second output port without including the first processed packets.

In another embodiment, a method for cryptographically processing information in a high-assurance manner is disclosed. In one step, a first packet is received on a first input port. The first packet is labeled to produce a labeled first packet. The labeling of the first packet is checked. The labeled first packet is transported on an input port to a cryptographic module. The labeled first packet is processed with the cryptographic module to produce a processed first packet. The processed first packet is transported with the output port of the cryptographic module. A second packet is received on a second input port. The second packet is labeled to produce a labeled second packet. That labeling of the second packet is checked to confirm it was performed properly. The labeled second packet is transported with the input port to the cryptographic module. The labeled second packet is processed with the cryptographic module to produce a processed second packet. The processed second packet is transported with the output port of the cryptographic module. The processed first packet is separated from the processed second packet. Labeling on the processed first packet is checked to confirm that the processed first packet is intended for a first output port. Information is coupled from the processed first packet to the first output port. Labeling on the processed second packet is checked to confirm that the processed second packet is intended for a second output port. Information is coupled from the processed second packet to the second output port.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
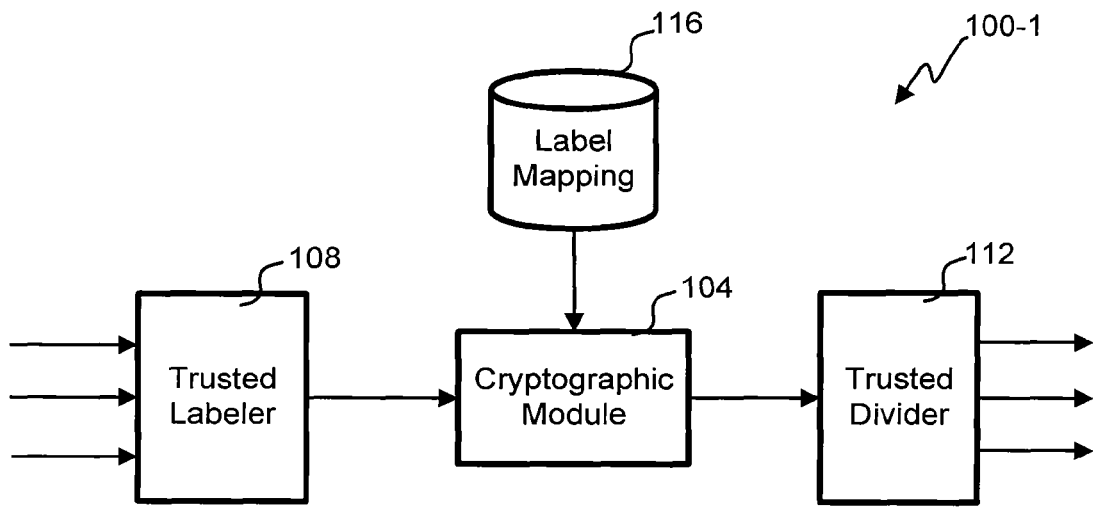
FIGS. 1A, 1B and 1C depict block diagrams of embodiments of a cryptographic device.

Referring first to FIG. 1A, a block diagram of an embodiment of a cryptographic device 100-1 is shown. The cryptographic device 100-1 processes information that can be broken into packets. Information flows from right to left in the block diagram. There are several input and output ports that are assigned to a partition or classification level. A partition is defined by an input port, an algorithm and an output port. A partition generally holds information of a particular government classification. The cryptographic device 100-1 isolates information in different partitions from intermixing. In other words, no information from one partition can bleed over into another partition within the cryptographic device.

A trusted labeler 108 receives information on two or more input ports. The information on each port is uniquely labeled in a high-assurance manner before passing the information to a common interface to a cryptographic module 104. The label of packets on the common interface allows distinguishing information from the various input ports. Buffers in the trusted labeler 108 allow servicing all the input ports and queuing packets to the cryptographic module 104.

Any number of algorithms can be applied by the cryptographic module 104 on a packet by packet basis. By looking at the port label for a packet, the cryptographic module 104 can determine the proper algorithm to apply to the packet. The algorithm definition could specify a specific key(s) to use. The cryptographic module 104 can use DES, 3DES, AES and various other unclassified and classified algorithms as desired for the particular port. Additionally, processing that isn't necessarily cryptographic can be performed. For example, no encryption or bypass, compression, reformatting, etc. can be performed on the information.

The cryptographic module 104 receives information on a single pathway and/or outputs information on a single pathway. By partitioning information according to port label, isolation can be assured. Various processing paths through the cryptographic module 104 can be dynamically configured using some of the same circuits and some unique circuits for a particular packet as that packet is processed.

A policy is loaded into a label mapping store 116. This policy is downloaded in a trusted manner to avoid unwanted reprogramming of the cryptographic 100-1. The policy cannot be modified during normal operation while processing information. Additionally, the policy can only be modified externally and not by the cryptographic device 100 itself.

The cryptographic module 104 reads the policy from the label mapping store 116. An example policy is shown in the Table. This embodiment has four input ports and four output ports. Different algorithms are specified for each path from input port to output port. For example, a third input port receives Secret classified information and performs an AES encryption using the fourteenth key, which is a 192 bit key. This embodiment has a partition that only performs compression, specifically, the fourth input port receives information and a LZW compression algorithm is applied before outputting the packets on the third output port.

TABLE

Policy of the Label Mapping Store

| Input Port | Output Port | Classification Level | Algorithm |
| --- | --- | --- | --- |
| 1 | 1 | For Official Use Only | DES; Key 6 |
| 2 | 2 | Confidential | Triple DES; Key 4 |
| 3 | 4 | Secret | AES 192; Key 14 |
| 4 | 3 | Unclassified | LZW Compression |

The cryptographic module 104 outputs information on a common output interface. The various packets are indicated by port number or some other unique identifier. The cryptographic module 104 could change the received input port identifier to the output port identifier. In any event, the trusted divider 112 is able to divide the received packets according to the intended output port defined in the policy in a high-assurance manner. A number of output ports are provided with a different output port for each partition.

Figure 1B:
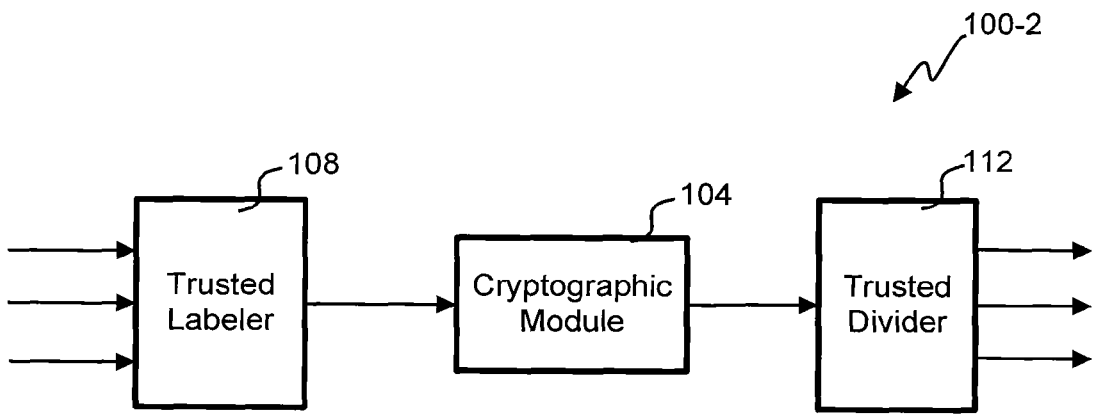

With reference to FIG. 1B, a block diagram of another embodiment of a cryptographic device 100-2 is shown. This embodiment doesn't have a policy that can be updated. The pathway from input to output port and algorithm are hard-code programmed into the circuitry at manufacture. The partitions and policy are defined during design and cannot be redefined in the field.

Figure 1C:
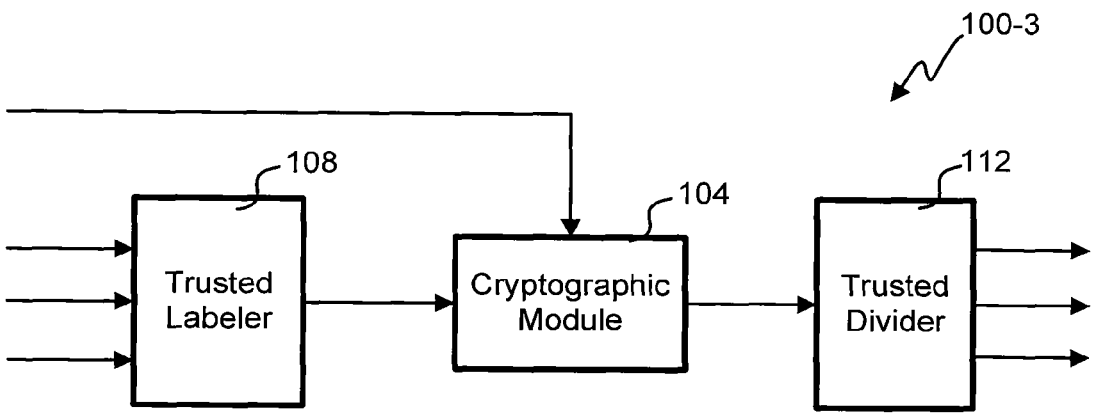

Referring next to FIG. 1C, a block diagram of yet another embodiment of a cryptographic device 100-3 is shown. The cryptographic device 100-1 in this embodiment is wholly or partially reprogrammable. The policy and partitions can be changed by reprogramming the circuitry in the cryptographic module 104. A FPGA, PLD or other reprogrammable circuit can be changed in the field to change the logic of at least the cryptographic module 104 to implement the policy and enforce the partitions.

Figure 2A:
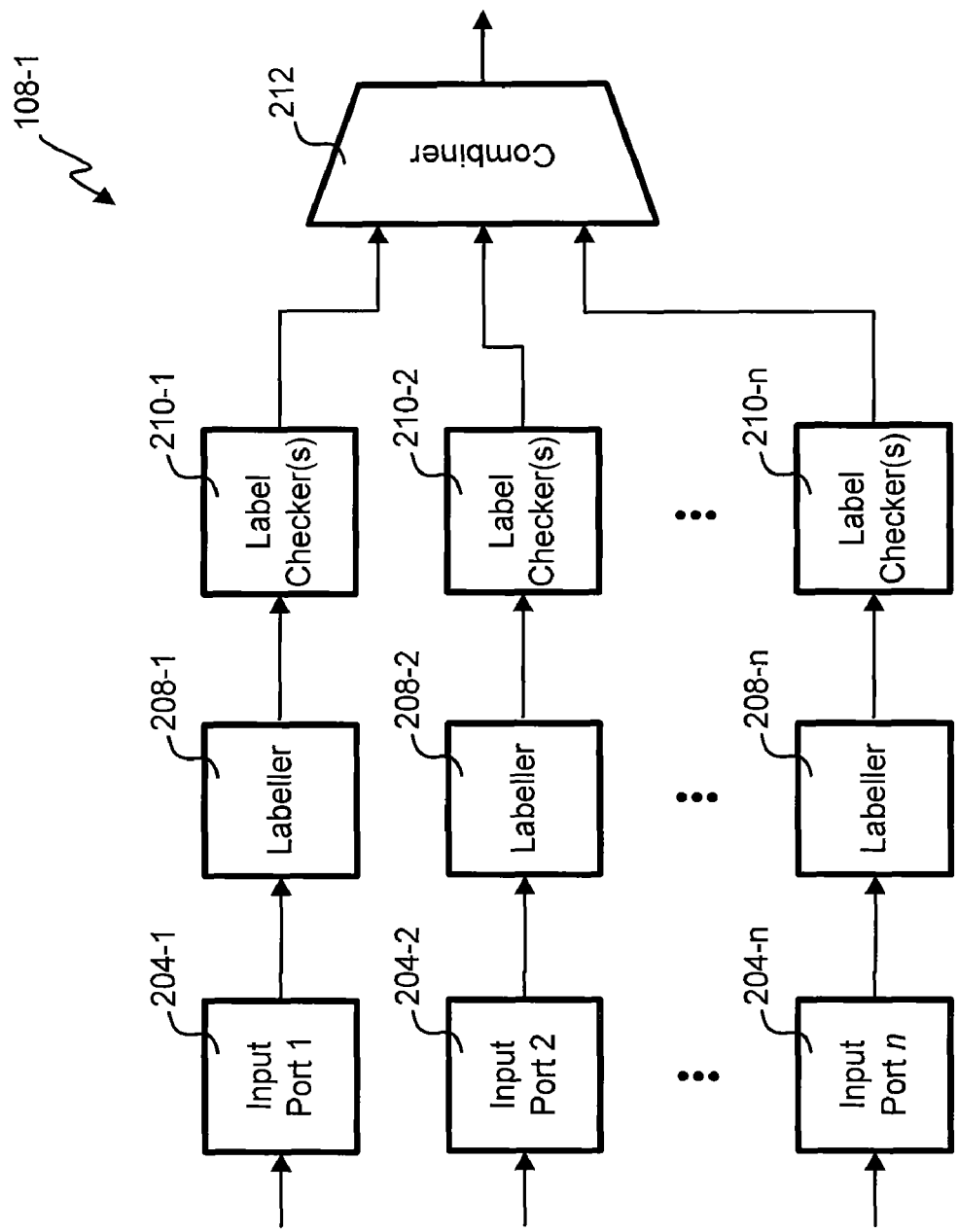
FIGS. 2A and 2B depict block diagrams of embodiments of a trusted labeler.

With reference to FIG. 2A, a block diagram of an embodiment of a trusted labeler 108-1 is shown. The trusted labeler 108-1 puts a label on each packet unique to each input port 204. There are n input ports 204 to receive information that could be in a stream or packetized. Various embodiments could have two, three, four, five, eight, ten, twelve or more input ports as required by the desired number of partitions. The input port 204 divides streams into packets where that has not be done earlier.

Each input port 204 has an unique identifier associated with the input port 204. A labeler 208 appends a label to each packet for its respective input port 204. The label is a binary number in this embodiment, for example, the second port could have a label of 001b. The label could be placed at the beginning or end of each packet or coded into the data of the packet. Some embodiments could put multiple redundant labels to provide high-assurance.

After placement of the label on the packet, that label is checked one or more times to provide high-assurance that the label was placed correctly. This embodiment has a single label checker 210. Where the label is incorrect, the packet could be discarded, returned to have the label fixed or other remedial measures could be taken.

The packets from all the ports are passed to a combiner 212 after being labeled and checked. Packets are aggregated onto a common interface by the combiner 212. There may be some buffering to align them with respect to each other. The combiner may operate in a first come, first serve, manner or according to some other policy or algorithm. For example, traffic on certain input ports 204 may be prioritized over other input ports 204.

Figure 2B:
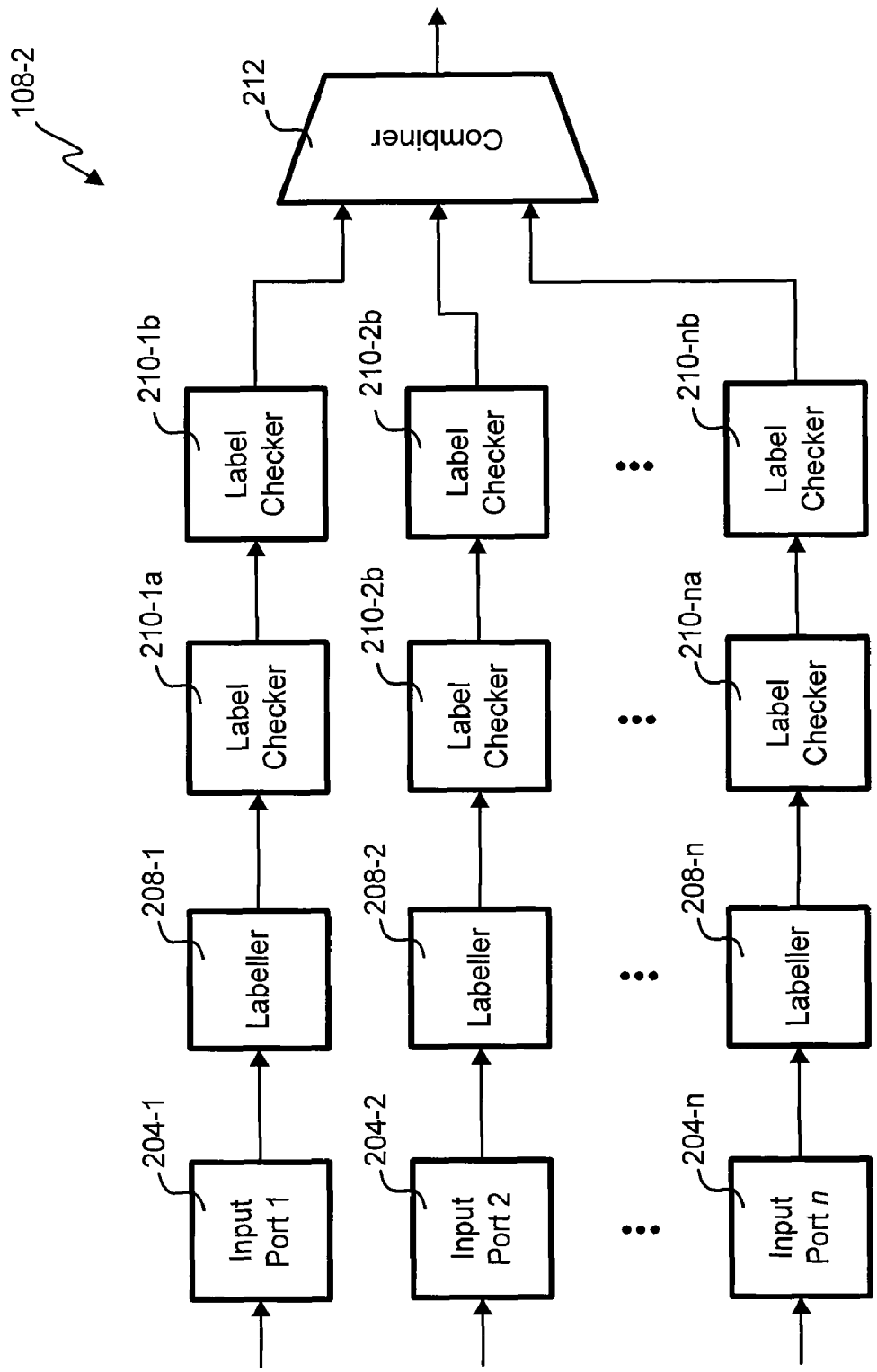

Referring next to FIG. 2B, a block diagram of another embodiment of a trusted labeler 108-2 is shown. As mentioned above, there can be any number of label checkers 210 as desired by the level of high-assurance. This embodiment uses two label checkers 210 in series, but they can also be configured in parallel for other embodiments. Any of the label checkers 210 can identify an improper label for a particular packet.

Figure 3A:
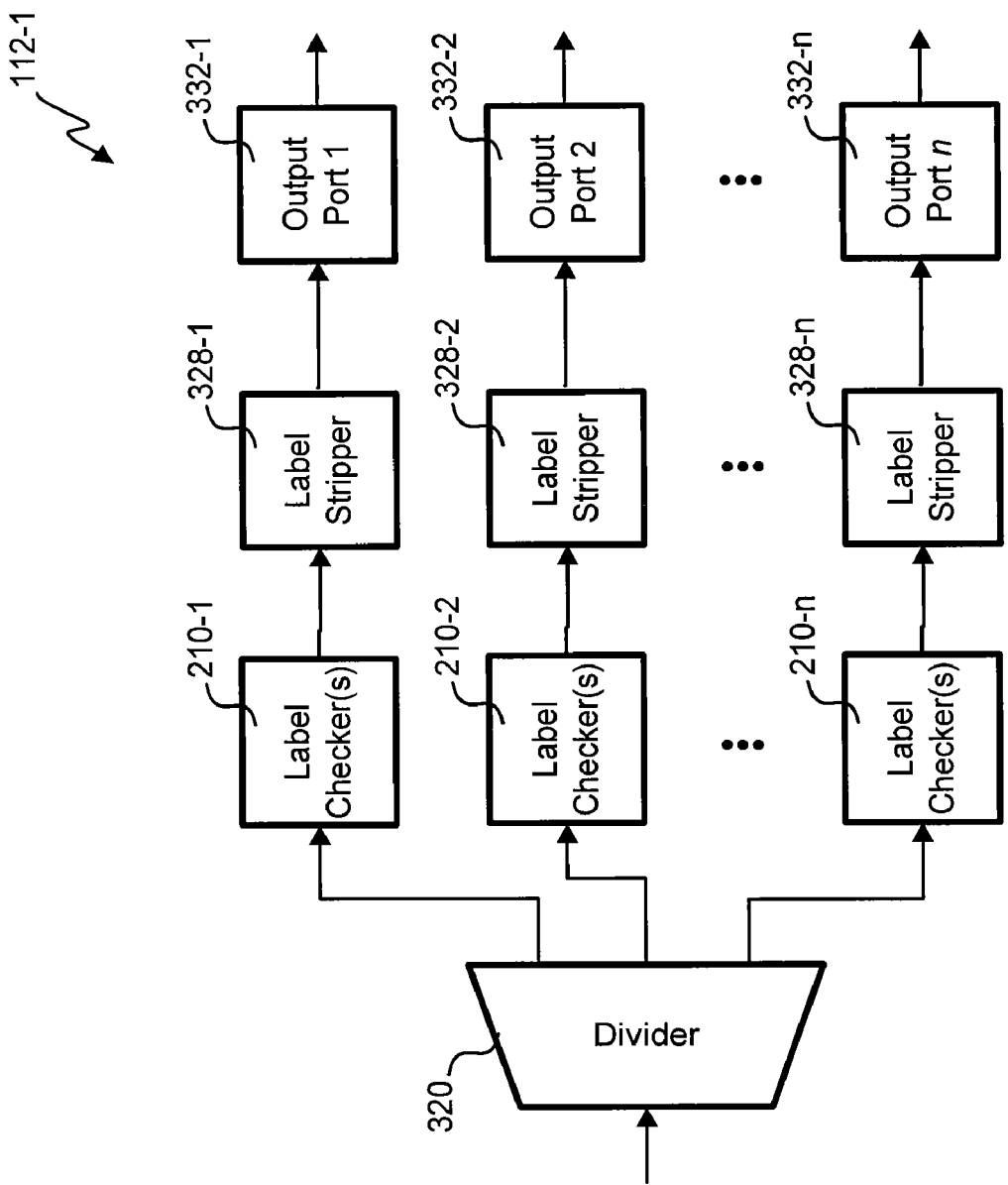
FIGS. 3A and 3B depict block diagrams of embodiments of a trusted divider.

With reference to FIG. 3A, a block diagram of an embodiment of a trusted divider 112-1 is shown. The trusted divider receives packets that are labeled for the particular output port they are destined for. The label could be the same one that the labeler 208 put on or a different label defined according to the policy. A divider 320 receives each packet, inspects the label and distributes the packet along a processing path that ends with the output port 332 defined by the label.

After the divider 320 there are multiple pathways that ultimately end in an output port 332. The pathways are physically isolated from each other. The divider 320 could be malfunctioning. Where that is the case, a label checker 210 would catch the error before a packet reached an output port 332. Depending on the level of high-assurance desired, there could be any number of label checkers 210 in series or parallel with each other for a particular pathway.

After the label is checked, there is no further need for the label as physical isolation maintains the separation as the partition. A label stripper 328 removes the label from each packet it receives. Some embodiments forgo stripping the label within the cryptographic device 100 and leave the information embedded in the packets.

Packets are respectively received by each output port 332. The output port 332 can reassemble the packets into a stream or leave the information packetized. Each output port 332 is assigned to a partition or classification level.

Figure 3B:
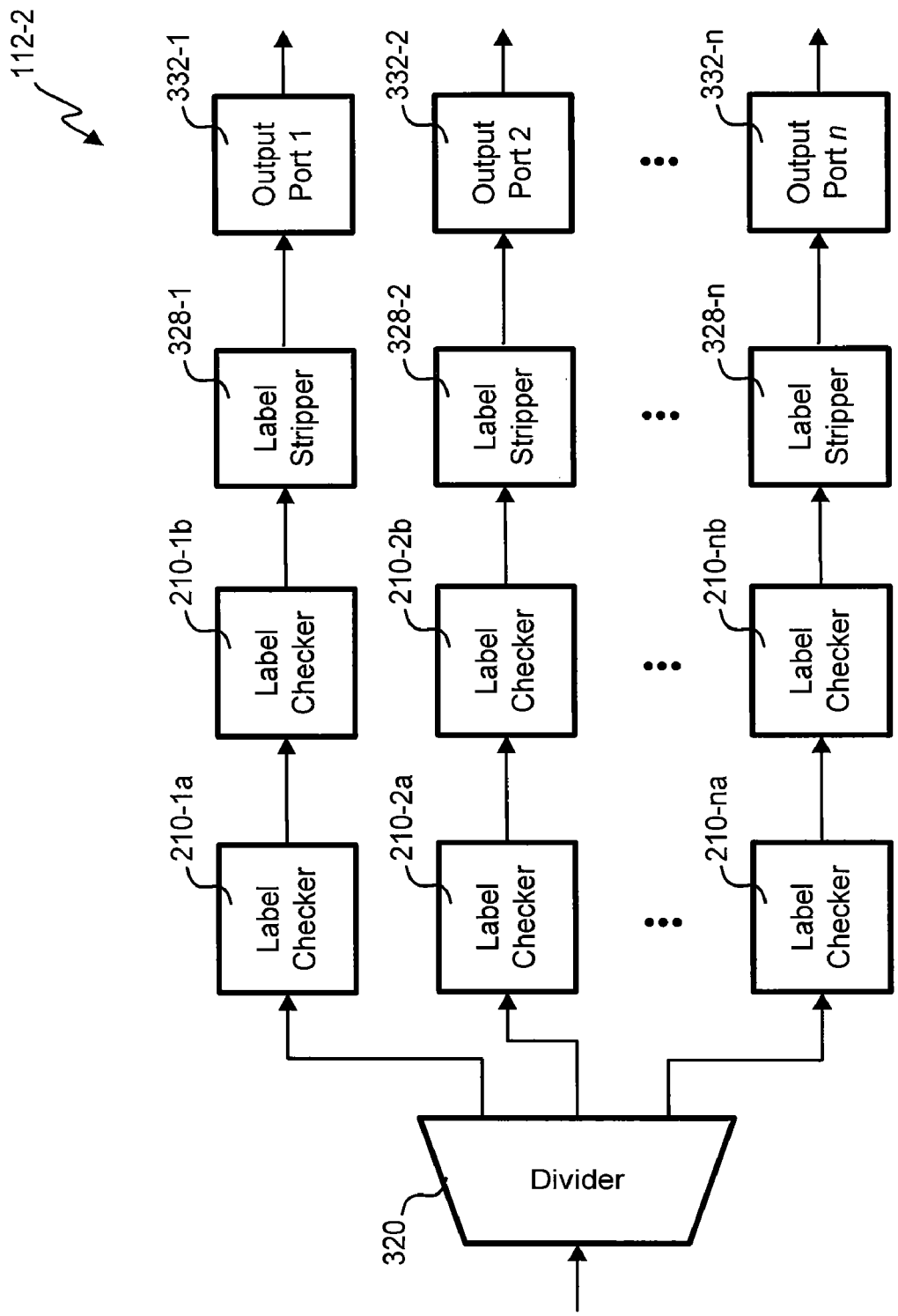

Referring next to FIG. 3B, a block diagram of another embodiment of a trusted divider 112-2 is shown. Each pathway in this embodiment inspects the label twice with label checkers 210. After checking, the label is removed in the label stripper 328. The output port for each partition makes the information available to other electronic equipment.

Figure 4:
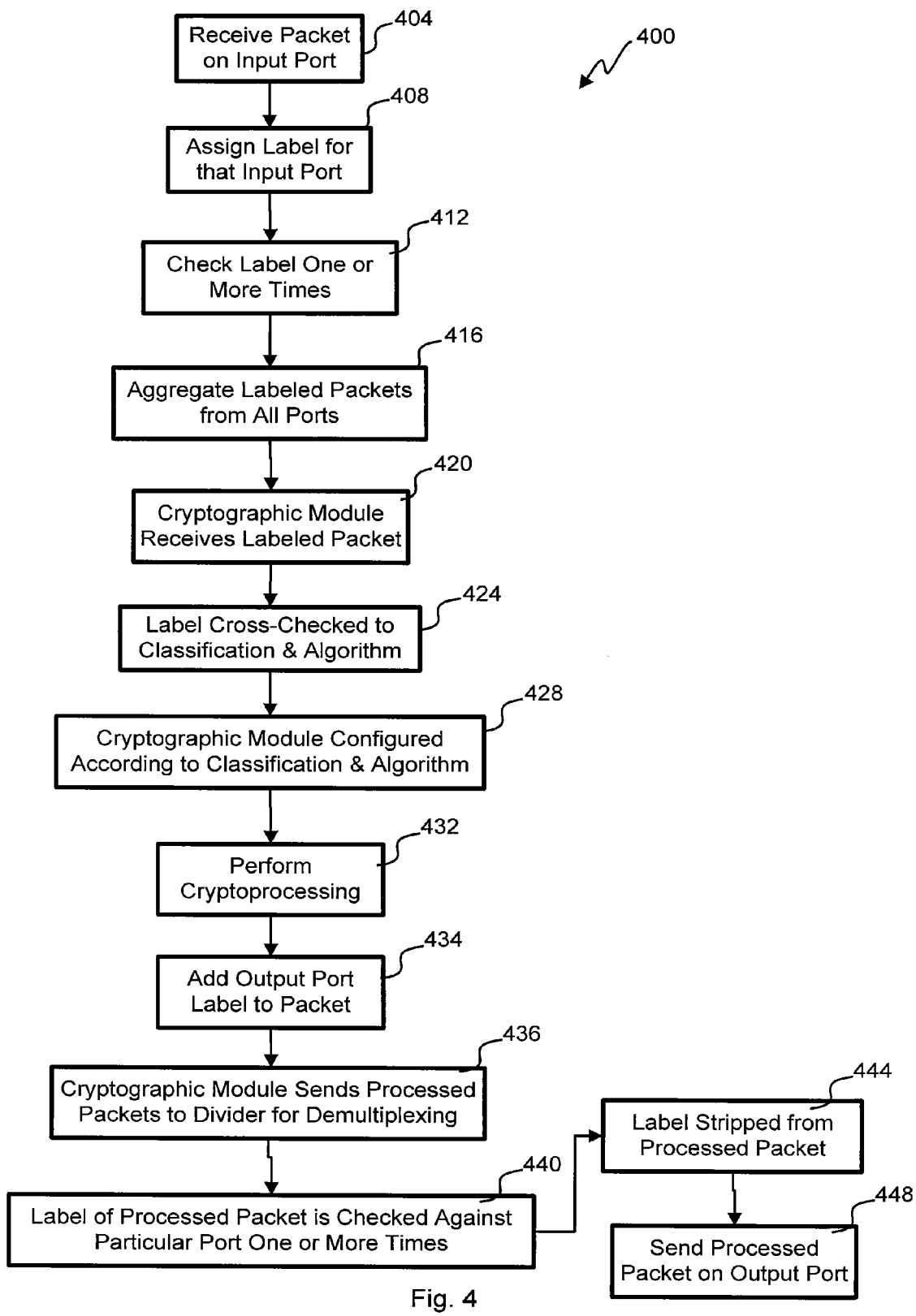
FIG. 4 illustrates a flowchart of an embodiment of a process for operating the cryptographic device.

With reference to FIG. 4, a flowchart of an embodiment of a process 400 for operating the cryptographic device 100 is shown. Although not shown, a policy is developed and programmed into the cryptographic device in a secure manner. The depicted portion of the process begins in block 404, where a packet is received on an input port 204. In block 408, an unique label is assigned to the packet to identify the input port 204.

The assigned label is independently verified one or more times in block 412. The combiner 212 takes all labeled packets from the input ports 204 and aggregates them onto a common conduit in block 416. The cryptographic module 104 receives the labeled packet in block 420. The policy is retrieved from the label mapping store 116, and the label is crossed to classification, algorithm and output port 332 in block 424.

The cryptographic module 104 is configured according to the classification and algorithm in block 428. Any keys are loaded and various processing modules are configured. This embodiment of the cryptographic module 104 processes one packet at a time, but other embodiments process multiple packets at one time or even streams of information. An output port label is put on the packet in a high-assurance manner in block 434. Two or more label checkers could be used to assure the label was added correctly. Any output port can be designated with the output port label.

The cryptographic module 104 performs processing in block 432. Typically, the processing is a cryptographic algorithm, but not necessarily so. The cryptographic module sends the processed packets to the divider 320. In block 436, the divider 320 routes the packets to the appropriate datapath associated with the output port 332 designated by the label. One or more label checks in block 440 confirm that the label of the packet matches the datapath the divider 320 has chosen. Exception processing and/or remedial measures would occur if the label didn't match.

In block 444, the label is stripped from the packet. This step is optional. The packet is sent to the output port before being available outside the cryptographic device 100. The output port 332 can assemble the packets into a stream in some embodiments. In this embodiment, the packets are produced to the output port 332 before passage outside the cryptographic device 100 as a packet in block 448.

A number of variations and modifications of the disclosed embodiments can also be used. For example, embodiments discuss having a partition use a single input port and a single output port. Other embodiments are not so limited. A partition can receive information on one or more input ports, apply one or more algorithms and output information on one or more output ports. For example, information on a third input port may be received and encrypted using two different algorithms and output on a first port for a first algorithm and output on a second port for a second algorithm. In another example, two input ports receive information, apply an algorithm, and output on two output ports.

Embodiments are described in relation to cryptographic processing where the trusted labeler is used in that context. Other embodiments could use trusted labeling for any application where information is logically separated on common datapaths. The high-assurance labeling would serve as a logical separation that could be trusted to be maintained. For example, banking information could be kept separate from a video feed passing through the same switch.

While the principles of the disclosure have been described above in connection with specific apparatuses and methods, it is to be clearly understood that this description is made only by way of example and not as limitation on the scope of the disclosure.

What is claimed is:

1. A cryptographic device for processing classified information having a plurality of different classification levels, the cryptographic device comprising:
   a labeler module comprising:
      a first input port;
      a first input labeler coupled to the first input port, wherein the first input labeler labels first packets after the first packets have been received at the first input port with first input label information associated with the first input port;
      a second input port physically isolated from the first input port;
      a second input labeler different from the first input labeler, the second input labeler coupled to the second input port, wherein the second input labeler labels second packets after the second packets have been received at the second input port with second input label information associated with the second input port, and further wherein the first input label information is distinguishable from the second input label information;
      an input label checker between the first and/or second input labelers and a cryptographic module, wherein the input label checker checks if the first input labeler has labeled the first packets with the first label information and/or checks if the second input labeler has labeled the second packets with the second label information; and
      a combiner that combines the first packets and the second packets and outputs the combined first and second packets on a first common datachannel;
   the cryptographic module coupled to the combiner and configured to process the combined first and second packets received from the combiner, wherein:
      the cryptographic module uses the first and second input label information to distinguish the first packets from the second packets, and
      the cryptographic module produces a first processed packet from the first packet and a second processed packet from the second packet and outputs the first processed packet and the second processed packet on a second common datachannel;
   a divider module comprising:
      a first output port;
      a second output port physically isolated from the first output port;
      a router coupled to the cryptographic module that receives the first and second processed packets on the second common datachannel from the cryptographic module, wherein:
         the router divides out the first processed packets from the second processed packets according to output labels, wherein the output labels of the first processed packets comprise information indicating that the first processed packets are destined for the first output port and the output labels of the second processed packets comprise information indicating that the second processed packets are destined for the second output port,
         the router couples the first processed packets to the first output port without including the second processed packets, and
         the router couples the second processed packets to the second output port without including the first processed packets;
      an output label checker between the router and the first and/or second output ports that checks if the output labels of the first processed packets comprise the information indicating that the first processed packets are destined for the first output port and/or checks if the output labels of the second processed packets comprise the information indicating that the second processed packets are destined for the second output port.

2. The cryptographic device for processing classified information having the plurality of different classification levels as recited in claim 1, wherein different processing algorithms are used within the cryptographic module for the first and second packets.

3. The cryptographic device for processing classified information having the plurality of different classification levels as recited in claim 1, wherein the output labels can be programmable to select any of a plurality of output ports.

4. The cryptographic device for processing classified information having the plurality of different classification levels as recited in claim 1, wherein the first and second packets share common pathways within the cryptographic module.

5. The cryptographic device for processing classified information having the plurality of different classification levels as recited in claim 1, wherein the first common datachannel and the second common datachannel carry packets of different government classification levels.

6. The cryptographic device for processing classified information having the plurality of different classification levels as recited in claim 1, wherein:
   the first input port is assigned to a first classification level, and
   the second input port is assigned to a second classification level, which is different from the first classification level.

7. A cryptographic device for processing information divided into partitions in a high-assurance manner, the cryptographic device comprising:
   a labeler module comprising:
      a first input port;
      a first input labeler coupled to the first input port, wherein the first input labeler labels first packets after the first packets have been received at the first input port with first input label information associated with the first input port;
      a second input port physically isolated from the first input port;
      a second input labeler different from the first input labeler, the second input labeler coupled to the second input port, wherein the second input labeler labels second packets after the first packets have been received at the second input port with second input label information associated with the second input port; and a combiner that combines the first packets and the second packets and outputs the combined first and second packets on a first common datachannel;

a cryptographic module coupled to the combiner and configured to process the combined first and second packets received from the combiner according to input labels, wherein:

different processing algorithms are used for the first and second packets to produce first processed packets and second processed packets, and the cryptographic module uses the first input label information and the second input label information to distinguish the first packets from the second packets;

the cryptographic module outputs the first processed packets and the second processed packets on a second common datachannel;

a divider module comprising:

a first output port;

a second output port physically isolated from the first output port; and a router coupled to the cryptographic module that receives the first and second processed packets on the second common datachannel, wherein:

the router divides out the first processed packets from the second processed packets according to the first and second input label information, the router couples the first processed packets to the first output port without including the second processed packets, and the router couples the second processed packets to the second output port without including the first processed packets.

8. The cryptographic device for processing information in the high-assurance manner as recited in claim 7, wherein the first and second packets share common pathways within the cryptographic module.

9. The cryptographic device for processing information in the high-assurance manner as recited in claim 7, wherein a first label applied to the first packet is mapped to a government classification level.

10. The cryptographic device for processing information in the high-assurance manner as recited in claim 7, wherein the first common datachannel and the second common data channel carry packets of different government classification levels.

11. The cryptographic device for processing information in the high-assurance manner as recited in claim 7, wherein:

the first input port is assigned to a first classification level, and the second input port is assigned to a second classification level, which is different from the first classification level.

12. The cryptographic device for processing information in the high-assurance manner as recited in claim 7, further comprising a label checker between the first and/or second input labelers and the cryptographic module that checks if the first and/or second input labelers are functioning.

13. The cryptographic device for processing information in the high-assurance manner as recited in claim 12, further comprising a second label checker after the label checker to confirm a second time that the first and/or second input labelers are functioning.

14. The cryptographic device for processing information in the high-assurance manner as recited in claim 7, further comprising a label checker between the cryptographic module and the first and/or second output ports that checks if the router is functioning.

15. The cryptographic device for processing information in the high-assurance manner as recited in claim 14, further comprising a second label checker after the label checker to confirm a second time that the first and/or second input labelers are functioning.

16. A method for cryptographically processing information in a high-assurance manner, the method comprising steps of:

receiving a first packet on a first input port;

after receiving the first packet, labeling the first packet using a first input labeler to produce a labeled first packet;

checking that labeling the first packet step was performed;

transporting the labeled first packet to a combiner;

receiving a second packet on a second input port;

after receiving the second packet, labeling the second packet using a second input labeler different from the first input labeler to produce a labeled second packet;

checking that labeling the second packet step was performed;

transporting the labeled second packet to the combiner;

transporting the labeled first packet and the labeled second packet from the combiner to a cryptographic module on a first common datachannel;

processing the labeled first packet and the labeled second packet with the cryptographic module to produce a processed first packet and a processed second packet;

transporting the processed first packet and the processed second packet from the cryptographic module to a divider on a second common datachannel;

separating the processed first packet from the processed second packet at the divider;

checking labeling on the processed first packet to confirm that the processed first packet is intended for a first output port;

coupling information from the processed first packet to the first output port;

checking labeling on the processed second packet to confirm that the processed second packet is intended for a second output port; and coupling information from the processed second packet to the second output port.

17. The method for cryptographically processing information in the high-assurance manner as recited in claim 16, further comprising a step of changing labeling between the first packet and the processed first packet according to a predetermined function.

18. The method for cryptographically processing information in the high-assurance manner as recited in claim 16, further comprising a step of assigning an output label to the first packet to select the first output port from any of a plurality of output ports.

19. The method for cryptographically processing information in the high-assurance manner as recited in claim 16, further comprising steps of:

checking labeling on the processed first packet again; and checking labeling on the processed second packet again.

20. The method for cryptographically processing information in the high-assurance manner as recited in claim 16, further comprising steps of:

stripping labeling from the processed first packet; and stripping labeling from the processed second packet.

21. The method for cryptographically processing information in the high-assurance manner as recited in claim 16, further comprising a step of taking remedial measures should any of the checking steps fail.

22. The method for cryptographically processing information in the high-assurance manner as recited in claim 16, further comprising steps of:

determining a first algorithm to apply to the labeled first packet; and determining a second algorithm to apply to the labeled second packet, wherein the first algorithm is different from the second algorithm.

\* \* \* \* \*